United States Patent
Kumamoto

(10) Patent No.: US 7,879,751 B2
(45) Date of Patent: Feb. 1, 2011

(54) PRODUCTION PROCESS OF OLEFIN POLYMERIZATION CATALYST COMPONENT, OF OLEFIN POLYMERIZATION CATALYST, AND OF OLEFIN POLYMER

(75) Inventor: Shin-ichi Kumamoto, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/330,707

(22) Filed: Dec. 9, 2008

(65) Prior Publication Data

US 2009/0171045 A1  Jul. 2, 2009

(30) Foreign Application Priority Data

Dec. 27, 2007  (JP) .............................. 2007-336498

(51) Int. Cl.
*B01J 37/06* (2006.01)
*C08F 4/02* (2006.01)

(52) U.S. Cl. ........................ 502/133; 502/103; 502/118; 502/119; 502/158; 526/124.3; 526/129; 526/126; 526/348

(58) Field of Classification Search ............... 526/124.3, 526/129, 126, 348; 502/103, 118, 119, 133, 502/158
See application file for complete search history.

(56) References Cited

U.S. PATENT DOCUMENTS

| | | | |
|---|---|---|---|
| 5,608,018 A | 3/1997 | Ebara et al. | |
| 6,187,883 B1 | 2/2001 | Satoh et al. | |
| 2001/0031696 A1 | 10/2001 | Kumamoto et al. | |
| 2002/0028892 A1 | 3/2002 | Goto et al. | |
| 2003/0065111 A1* | 4/2003 | Yoshimura et al. | ........ 526/124.3 |
| 2003/0195108 A1 | 10/2003 | Kumamoto et al. | |
| 2004/0092679 A1 | 5/2004 | Kumamoto | |
| 2004/0266609 A1 | 12/2004 | Tanase et al. | |
| 2007/0244277 A1 | 10/2007 | Hosaka et al. | |

FOREIGN PATENT DOCUMENTS

JP  11-269218 A  10/1999

\* cited by examiner

*Primary Examiner*—Ling-Siu Choi
(74) *Attorney, Agent, or Firm*—Panitch Schwarze Belisario & Nadel LLP

(57) ABSTRACT

A solid catalyst component for olefin polymerization, comprising titanium atoms, magnesium atoms, halogen atoms and hydrocarbyloxy groups, wherein the following filtrate contains titanium atoms in a concentration of 0.08 mg-Ti/ml-filtrate or lower, measured according to a method comprising the steps of (1) preparing a suspension of the solid catalyst component for olefin polymerization in heptane having a concentration of 0.1 g-solid catalyst component/ml-suspension, (2) heating the suspension at 70° C. for 30 minutes under stirring, (3) filtering the suspension, thereby obtaining a filtrate, and (4) measuring a concentration of titanium atoms contained in the filtrate; and a production process of the solid catalyst component.

7 Claims, No Drawings

«PRODUCTION PROCESS OF OLEFIN POLYMERIZATION CATALYST COMPONENT, OF OLEFIN POLYMERIZATION CATALYST, AND OF OLEFIN POLYMER

FIELD OF THE INVENTION

The present invention relates to a process for producing a solid catalyst component for olefin polymerization, a process for producing an olefin polymerization catalyst, and a process for producing an olefin polymer.

BACKGROUND OF THE INVENTION

JP 10-212319A (corresponding to U.S. Pat. No. 6,187,883B) discloses a highly stereoregular olefin polymer produced by polymerizing an olefin in the presence of a polymerization catalyst, the catalyst being formed according to a process comprising the steps of (1) reducing a titanium compound with an organomagnesium compound in the presence of a combination of an organosilicon compound with an ester compound, thereby producing a solid product, (2) contacting the solid product with a halogenation compound, an internal electron donor and an organic acid halide, thereby producing a solid catalyst component containing trivalent titanium atoms, and (3) contacting the solid catalyst component containing trivalent titanium atoms, an organoaluminum compound and an external electron donor.

SUMMARY OF THE INVENTION

However, the above highly stereoregular olefin polymer is not sufficient in stiffness of its injection-molded article, namely, is not sufficient in its stereoregularity, whereas injection-molded articles having superior stiffness are particularly required.

In view of the above circumstances, the present invention has an object to provide:
(i) a solid catalyst component for olefin polymerization capable of producing a highly stereoregular olefin polymer, which can be molded into an injection-molded article having superior stiffness;
(ii) a process for producing the above solid catalyst component (i);
(iii) a process for producing an olefin polymerization catalyst using the above solid catalyst component (i); and
(iv) a process for producing an olefin polymer using an olefin polymerization catalyst produced according to the above process (iii).

The present invention is a solid catalyst component for olefin polymerization, comprising titanium atoms, magnesium atoms, halogen atoms and hydrocarbyloxy groups, wherein the following filtrate contains titanium atoms in a concentration of 0.08 mg-Ti/ml-filtrate or lower, measured according to a method comprising the steps of:
(1) preparing a suspension of the solid catalyst component for olefin polymerization in heptane having a concentration of 0.1 g-solid catalyst component/ml-suspension;
(2) heating the suspension at 70° C. for 30 minutes under stirring;
(3) filtering the suspension, thereby obtaining a filtrate; and
(4) measuring a concentration of titanium atoms contained in the filtrate.

Also, the present invention is a process for producing the above solid catalyst component for olefin polymerization, comprising the following steps (1) and (4) in this order, or comprising the following step (1), one or more repetitions of a combination of the following steps (2) and (3) in this order, and the following step (4), in this order:
(1) contacting a solid material containing magnesium atoms and hydrocarbyloxy groups, a halogenation compound and an internal electron donor and/or organic acid halide with one another, thereby obtaining a solid component;
(2) washing the solid component with a hydrocarbon solvent;
(3) contacting the washed solid component, a halogenation compound, and an internal electron donor and/or organic acid halide with one another; and
(4) washing the solid component with a hydrocarbon solvent at 70° C. or higher four or more times.

Further, the present invention is a process for producing an olefin polymerization catalyst, comprising the step of contacting a solid catalyst component for olefin polymerization produced according to the above production process, an organoaluminum compound and an external electron donor with one another.

Furthermore, the present invention is a process for producing an olefin polymer, comprising the step of contacting an olefin with an olefin polymerization catalyst produced according to the above production process.

DETAILED DESCRIPTION OF THE INVENTION

As explained above, the process of the present invention for producing a solid catalyst component for olefin polymerization has two embodiments. The first embodiment comprises the above steps (1) and (4), and those steps are carried out in this order. The second embodiment comprises the above step (1), one or more repetitions of a combination of the above steps (2) and (3), and the above step (4), and those steps are carried out in this order. In case that the second embodiment has two repetitions of a combination of the above steps (2) and (3), all the steps are carried out in the following order:
step (1)→step (2)→step (3)→step (2)→step (3)→step (4).

It should be noted that both embodiments have the step (4) after the step (1) in case of the first embodiment, or after the final step (3) in case of the second embodiment.

Regarding the Step (1):

The solid component obtained in the step (1) may be known in the art, which is disclosed in prior arts such as JP 10-212319A corresponding to U.S. Pat. No. 6,187,883B and JP 7-216017A corresponding to U.S. Pat. No. 5,608,018A.

Examples of the solid material used in the step (1) are the following solid materials (i) to (iii), and the solid material (iii) is preferable among them:
(i) dihydrocarbyloxymagnesiums represented by the formula, $Mg(OR^1)(OR^2)$, wherein $R^1$ and $R^2$ is independently of each other a hydrocarbyl group having 1 to 20 carbon atoms;
(ii) hydrocarbyloxymagnesium halides represented by the formula, $Mg(OR^3)X^1$, wherein $R^3$ is a hydrocarbyl group having 1 to 20 carbon atoms, and $X^1$ is a halogen atom; and
(iii) solid materials containing trivalent titanium atoms, magnesium atoms and hydrocarbyloxy groups.

Examples of the dihydrocarbyloxymagnesiums represented (i) by the above formula, $Mg(OR^1)(OR^2)$, are dimethoxymagnesium, diethoxymagnesium, dipropoxymagnesium, dibutoxymagnesium, dipentoxymagnesium, dihexyloxymagnesium, dioctoxymagnesium, diphenoxymagnesium, dicyclohexyloxymagnesium, methoxyethoxymagnesium, methoxypropoxymagnesium, methoxybutoxymagnesium, ethoxypropoxymagnesium, and ethoxybutoxymagnesium. Among them, preferred is dimethoxymagnesium, diethoxymagnesium or dipropoxymagnesium, and more preferred is diethoxymagnesium.

A process for producing dihydrocarbyloxymagnesiums (i) represented by the above formula, $Mg(OR^1)(OR^2)$, is not limited. Preferable examples thereof are (1) a process comprising the step of reacting a magnesium metal, an alcohol and a small amount of a halogen-containing compound and/or halogen, with one another, and (2) a process comprising the step of reacting a dialkylmagnesium compound with an alkoxysilicon compound.

Examples of the hydrocarbyloxymagnesium halides (ii) represented by the above formula, $Mg(OR^3)X^1$, are methoxymagnesium chloride, ethoxymagnesium chloride, propoxymagnesium chloride, butoxymagnesium chloride, pentoxymagnesium chloride, hexyloxymagnesium chloride, octoxymagnesium chloride, phenoxymagnesium chloride, and cyclohexyloxymagnesium chloride, and compounds obtained by replacing the chlorine atom contained in the above-exemplified compounds with a fluorine atom, a bromine atom or a iodine atom. Among them, preferred is methoxymagnesium chloride, ethoxymagnesium chloride or propoxymagnesium chloride, and more preferred is ethoxymagnesium chloride.

A process for producing hydrocarbyloxymagnesium halides (ii) represented by the above formula, $Mg(OR^3)X^1$, is not limited. Preferable examples of the process are (1) a process comprising the step of reacting a Grignard compound with an alkoxysilicon compound, and (2) a process comprising the step of reacting a Grignard compound with alcohol.

Examples of the hydrocarbyloxy group contained in the above solid materials (iii) are hydrocarbyloxy groups having 1 to 20 carbon atoms. Among them, preferred is a methoxy group, an ethoxy group, a propoxy group, a butoxy group, a pentoxy group, or a hexoxy group.

The solid material used in the step (1) is preferably the above solid material (iii), which contains the trivalent titanium atoms in an amount of preferably 50% or more, and more preferably 90% or more, provided that the total amount of titanium atoms contained in the solid material (iii) is 100%, and contains the hydrocarbyloxy groups in an amount of preferably 20% by weight or more, and more preferably 25% by weight or more, provided that the amount of the solid material (iii) is 100% by weight.

A process for producing the solid material (iii) comprises, for example, the step of reducing a titanium compound represented by the following formula [I] with an organomagnesium compound in the presence of an organosilicon compound containing a Si—O bond, or in the presence of a combination of the organosilicon compound with an ester compound in view of improving an activity of a polymerization catalyst:

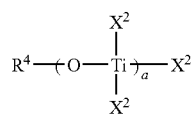

[I]

wherein $R^4$ is a hydrocarbyl group having 1 to 20 carbon atoms; $X^2$ is independently of one another a halogen atom or a hydrocarbyloxy group having 1 to 20 carbon atoms; and a is a number of 1 to 20, and preferably a number satisfying $1 \leq a \leq 5$.

Examples of $R^4$ in the above formula [I] are an alkyl group such as a methyl group, an ethyl group, a propyl group, an isopropyl group, a butyl group, an isobutyl group, an amyl group, an isoamyl group, a hexyl group, a heptyl group, an octyl group, a decyl group and a dodecyl group; an aryl group such as a phenyl group, a cresyl group, a xylyl group and a naphthyl group; a cycloalkyl group such as a cyclohexyl group and a cyclopentyl group; an allyl group such as a propenyl group; and an aralkyl group such as a benzyl group. Among them, preferred is an alkyl group having 2 to 18 carbon atoms, or an aryl group having 6 to 18 carbon atoms, and particularly preferred is a linear alkyl group having 2 to 18 carbon atoms.

Examples of the halogen atom of $X^2$ in the above formula [I] are a chlorine atom, a bromine atom and an iodine atom. Among them, particularly preferred is a chlorine atom.

Examples of the hydrocarbyloxy group having 1 to 20 carbon atoms of $X^2$ in the above formula [I] are those derived from the above-exemplified hydrocarbyl groups as $R^4$, such as a methoxy group derived from a methyl group, an ethoxy group derived from an ethyl group, etc. Among them, particularly preferred is an alkoxy group derived from the above-exemplified linear alkyl group having 2 to 18 carbon atoms as $R^4$, such as an ethoxy group derived from an ethyl group, etc.

Examples of the titanium compound represented by the above formula [I] are tetramethoxytitanium, tetraethoxytitanium, tetra-n-propoxytitanium, tetraisopropoxytitanium, tetra-n-butoxytitanium, tetraisobutoxytitanium, n-butoxytitanium trichloride, di-n-butoxytitanium dichloride, tri-n-butoxytitanium chloride, di-n-tetraisopropylpolytitanate which is a mixture of compounds having "a" of 2 to 10 in the above formula [I], tetra-n-butylpolytitanate which is a mixture of compounds having "a" of 2 to 10 in the above formula [I], tetra-n-hexylpolytitanate which is a mixture of compounds having "a" of 2 to 10 in the above formula [I], and tetra-n-octylpolytitanate which is a mixture of compounds having "a" of 2 to 10 in the above formula [I], and a condensate obtained by reacting tetraalkoxytitanium with a small amount of water. Among them, preferred is a titanium compound having "a" of 1, 2 or 4 in the above formula [I], and particularly preferred is tetra-n-butoxytitanium, tetra-n-butyltitanium dimer, or tetra-n-butyltitanium tetramer. Those titanium compounds may be used in a combination of two or more thereof.

Examples of the above organosilicon compound are those represented by the following respective formulas:

$Si(OR^5)_t R^6_{4-t}$, $R^7(R^8_2SiO)_u SiR^9_3$, and $(R^{10}_2SiO)_v$, wherein $R^5$ is a hydrocarbyl group having 1 to 20 carbon atoms; $R^6$, $R^7$, $R^8$, $R^9$ and $R^{10}$ are independently of one another a hydrocarbyl group having 1 to 20 carbon atoms, or a hydrogen atom; t is an integer satisfying $0 < t \leq 4$; u is an integer of 1 to 1,000; and v is an integer of 2 to 1,000.

Examples of the organosilicon compound are tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane and phenylhydropolysiloxane.

Among them, preferred is an alkoxysilane compound represented by the above formula, $Si(OR^5)_tR^6_{4-t}$, wherein t is preferably an integer satisfying $1 \leq t \leq 4$, and more preferably 4 (namely, tetraalkoxysilane compound). Tetraethoxysilane is the most preferable compound.

The above organomagnesium compound may be any compound containing a magnesium-carbon bond therein. The organomagnesium compound is preferably a Grignard compound represented by the following first formula, or a dihydrocarbylmagnesium represented by the following second formula:

$R^{11}MgX^3$, and $R^{12}R^{13}Mg$, wherein $R^{11}$ is a hydrocarbyl group having 1 to 20 carbon atoms; $X^3$ is a halogen atom; and $R^{12}$ and $R^{13}$ are independently of each other a hydrocarbyl group having 1 to 20 carbon atoms. Among them, more preferred is a Grignard compound, and particularly preferred is a solution of a Grignard compound in an ether, in order to obtain a polymerization catalyst having a good shape.

Examples of $R^{11}$, $R^{12}$ and $R^{13}$ are an alkyl group having 1 to 20 carbon atoms, an aryl group, an aralkyl group and an alkenyl group, such as a methyl group, an ethyl group, a propyl group, an isopropyl group, a butyl group, a sec-butyl group, a tert-butyl group, an isoamyl group, a hexyl group, an octyl group, a 2-ethylhexyl group, a phenyl group and a benzyl group.

The organomagnesium compound may be used as its complex soluble in a hydrocarbon solvent, which complex can be obtained by reacting the organomagnesium compound with an organometal compound such as that of Li, Be, B, Al or Zn.

Examples of the above ester compound are monocarboxylic acid esters and polycarboxylic acid esters. Among them, preferred are unsaturated aliphatic carboxylic acid esters such as methacrylic acid esters and maleic acid esters, or aromatic carboxylic acid esters such as phthalic acid esters, and particularly preferred are phthalic acid dialkyl esters. Specific examples thereof are saturated aliphatic carboxylic acid esters, unsaturated aliphatic carboxylic acid esters, alicyclic carboxylic acid esters, and aromatic carboxylic acid esters. More specific examples thereof are methyl acetate, ethyl acetate, phenyl acetate, methyl propionate, ethyl propionate, ethyl butyrate, ethyl valerate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, dipentyl phthalate, di-n-hexyl phthalate, di-n-heptyl phthalate, di-n-octyl phthalate, di(2-ethylhexyl) phthalate, diisodecyl phthalate, dicyclohexyl phthalate and diphenyl phthalate.

Each of the above organosilicon compound, titanium compound and ester compound is preferably combined with a solvent. Examples of the solvent are aliphatic hydrocarbons such as hexane, heptane, octane and decane; aromatic hydrocarbons such as toluene and xylene; alicyclic hydrocarbons such as cyclohexane, methylcyclohexane and decalin; and ether compounds such as diethyl ether, di-n-butyl ether, diisoamyl ether and tetrahydrofuran.

A temperature of the above reduction reaction is usually −50 to 70° C., preferably −30 to 50° C., and particularly preferably −25 to 35° C. A time thereof is not particularly limited, and it is usually about 30 minutes to about 6 hours. The reduction reaction may be followed by heating at 0 to 120° C.

The solid material prepared in the above reduction reaction may be supported on a carrier such as a porous inorganic oxide and a porous organic polymer. The carrier may be known in the art. Examples of the carrier are inorganic oxides such as $SiO_2$, $Al_2O_3$, $MgO$, $TiO_2$ and $ZrO_2$; and polymers such as polystyrene, a styrene-divinylbenzene copolymer, a styrene-ethylene glycol dimethacrylate copolymer, polymethyl acrylate, polyethyl acrylate, a methyl acrylate-divinylbenzene copolymer, polymethyl methacrylate, a methyl methacrylate-divinylbenzene copolymer, polyacrylonitrile, an acrylonitrile-divinylbenzene copolymer, polyvinyl chloride, polyethylene and polypropylene. Among them, preferred is an organic polymer, and particularly preferred is a styrene-divinylbenzene copolymer or an acrylonitrile-divinylbenzene copolymer.

In order to support effectively the solid material on a carrier, the carrier has a pore volume of preferably 0.3 $cm^3/g$ or more, and more preferably 0.4 $cm^3/g$ or more, in a pore radius of 20 to 200 nm. A ratio of the above pore volume is preferably 35% or more, and more preferably 40% or more, provided that a pore volume in a pore radius of 3.5 to 7,500 nm is 100%.

The above organosilicon compound is used in an amount of usually 1 to 500 mol, preferably 1 to 300 mol, and particularly preferably 3 to 100 mol, in terms of an amount of silicon atoms contained in the organosilicon compound, per mol of titanium atoms contained in the titanium compound used.

The above organomagnesium compound is used in an amount of usually 0.1 to 10 mol, preferably 0.2 to 5.0 mol, and particularly preferably 0.5 to 2.0 mol in terms of the amount of magnesium atoms contained in the organomagnesium compound used, per mol of the total of the amount of silicon atoms contained in the organosilicon compound used, and the amount of titanium atoms contained in the titanium compound used.

Also, the organosilicon compound, the titanium compound and the organomagnesium compound are respectively used such that a solid catalyst component contains magnesium atoms in an amount of usually 1 to 51 mol, preferably 2 to 31 mol, and particularly preferably 4 to 26 mol, per mol of titanium atoms contained in the solid catalyst component.

The above ester compound is used in an amount of usually 0.05 to 100 mol, preferably 0.1 to 60 mol, and particularly preferably 0.2 to 30 mol, per mol of titanium atoms contained in the titanium compound used.

The solid material obtained by the above reduction reaction is usually separated from a reaction mixture, and then, is washed several times with an inert hydrocarbon solvent such as hexane, heptane and toluene. The thus obtained solid material contains trivalent titanium atoms, magnesium atoms and hydrocarbyloxy groups. The solid material generally has an amorphous structure, or a very weak crystalline structure, and the former structure is particularly preferred.

The halogenation compound used in the above step (1) means a compound capable of replacing the hydrocarbyloxy group contained in the solid material with a halogen atom. The halogenation compound is preferably a halogen compound of Group 4, 13 or 14 elements in the Periodic Table of the elements, and more preferably a halogen compound of Group 4 or 14 elements. When the solid material contains no titanium atom, at least a halogen compound of a titanium atom is used as the halogenation compound.

The above halogen compound of Group 4 elements is preferably a compound represented by the following formula:

$$M^1(OR^{14})_b X^4_{4-b}$$

wherein $M^1$ is an atom of Group 4; $R^{14}$ is a hydrocarbyl group having 1 to 20 carbon atoms, and when plural $R^{14}$s exist, they are the same as, or different from one another; $X^4$ is a halogen atom; and b is a number satisfying $0 \leqq b < 4$, preferably $0 \leqq b \leqq 2$, and particularly preferably b=0.

Examples of the above $M^1$ are a titanium atom, a zirconium atom and a hafnium atom. Among them, preferred is a titanium atom.

Examples of the above $R^{14}$ are an alkyl group such as a methyl group, an ethyl group, a propyl group, an isopropyl group, a butyl group, an isobutyl group, a tert-butyl group, an amyl group, an isoamyl group, a tert-amyl group, a hexyl group, a heptyl group, an octyl group, a decyl group and a dodecyl group; an aryl group such as a phenyl group, a cresyl group, a xylyl group and a naphthyl group; an allyl group such as a propenyl group; and an aralkyl group such as a benzyl group. Among them, preferred is an alkyl group having 2 to 18 carbon atoms, or an aryl group having 6 to 18 carbon atoms, and particularly preferred is a linear alkyl group having 2 to 18 carbon atoms.

Examples of $X^4$ are a chlorine atom, a bromine atom and an iodine atom. Among them, particularly preferred is a chlorine atom.

Examples of the halogen compound of Group 4 elements represented by the above formula are a titanium tetrahalide such as titanium tetrachloride, titanium tetrabromide and titanium tetraiodide; an alkoxytitanium trihalide such as methoxytitanium trichloride, ethoxytitanium trichloride, butoxytitanium trichloride, phenoxytitanium trichloride and ethoxytitanium tribromide; and a dialkoxytitanium dihalide such as dimethoxytitanium dichloride, diethoxytitanium dichloride, dibutoxytitanium dichloride, diphenoxytitanium dichloride and diethoxytitanium dibromide; and hafnium compounds obtained by replacing the titanium atom contained in the above-exemplified titanium compounds with a hafnium atom. Among them, most preferred is titanium tetrachloride.

The above halogen compound of Group 13 or 14 elements is preferably a compound represented by the following formula:

$$M^2 R^{15}_{m-c} X^5_c$$

wherein $M^2$ is an atom of Group 13 or 14; $R^{15}$ is a hydrocarbyl group having 1 to 20 carbon atoms; $X^5$ is a halogen atom; m is the valence of $M^2$; and c is a number satisfying $0 < c \leqq m$.

Examples of the atom of Group 13 are a boron atom, an aluminum atom, a gallium atom, an indium atom and a thallium atom. Among them, preferred is a boron atom or an aluminum atom, and more preferred is an aluminum atom.

Examples of the atom of Group 14 are a carbon atom, a silicon atom, a germanium atom, a tin atom and a lead atom. Among them, preferred is a silicon atom, a germanium atom or a tin atom, and more preferred is a silicon atom or a tin atom.

For example, when $M^2$ is a silicon atom, m is 4, and c is preferably 3 or 4.

Examples of $X^5$ are a fluorine atom, a chlorine atom, a bromine atom and an iodine atom. Among them, preferred is a chlorine atom.

Examples of the above $R^{15}$ are an alkyl group such as a methyl group, an ethyl group, a n-propyl group, an isopropyl group, a n-butyl group, an isobutyl group, an amyl group, an isoamyl group, a hexyl group, a heptyl group, an octyl group, a decyl group and a dodecyl group; an aryl group such as a phenyl group, a tolyl group, a cresyl group, a xylyl group and a naphthyl group; a cycloalkyl group such as a cyclohexyl group and a cyclopentyl group; an allyl group such as a propenyl group; and an aralkyl group such as a benzyl group. Among them, preferred is an alkyl group or an aryl group; and more preferred is a methyl group, an ethyl group, a n-propyl group, a phenyl group or a p-tolyl group.

Examples of the above halogen compound of Group 13 elements are trichloroborane, methyldichloroborane, ethyldichloroborane, phenyldichloroborane, cyclohexyldichloroborane, dimethylchloroborane, methylethylchloroborane, trichloroaluminum, methyldichloroaluminum, ethyldichloroaluminum, phenyldichloroaluminum, cyclohexyldichloroaluminum, dimethylchloroaluminum, diethylchloroaluminum, methylethylchloroaluminum, ethylaluminum sesquichloride, gallium chloride, gallium dichloride, trichlorogallium, methyldichlorogallium, ethyldichlorogallium, phenyldichlorogallium, cyclohexyldichlorogallium, dimethylchlorogallium, methylethylchlorogallium, indium chloride, indium trichloride, methylindium dichloride, phenylindium dichloride, dimethylindium chloride, thallium chloride, thallium trichloride, methylthallium dichloride, phenylthallium dichloride and dimethylthallium chloride; and compounds obtained by replacing the chlorine atom contained in the above-exemplified compounds with a fluorine atom, a bromine atom or an iodine atom.

Examples of the above halogen compound of Group 14 elements are tetrachloromethane, trichloromethane, dichloromethane, monochloromethane, 1,1,1-trichloroethane, 1,1-dichloroethane, 1,2-dichloroethane, 1,1,2,2-tetrachloroethane, tetrachlorosilane, trichlorosilane, methyltrichlorosilane, ethyltrichlorosilane, n-propyltrichlorosilane, n-butyltrichlorosilane, phenyltrichlorosilane, benzyltrichlorosilane, p-tolyltrichlorosilane, cyclohexyltrichlorosilane, dichlorosilane, methyldichlorosilane, ethyldichlorosilane, dimethyldichlorosilane, diphenyldichlorosilane, methylethyldichlorosilane, monochlorosilane, trimethylchlorosilane, triphenylchlorosilane, tetrachlorogermane, trichlorogermane, methyltrichlorogermane, ethyltrichlorogermane, phenyltrichlorogermane, dichlorogermane, dimethyldichlorogermane, diethyldichlorogermane, diphenyldichlorogermane, monochlorogermane, trimethylchlorogermane, triethylchlorogermane, tri-n-butylchlorogermane, tetrachlorotin, methyltrichlorotin, n-butyltrichlorotin, dimethyldichlorotin, di-n-butyldichlorotin, di-isobutyldichlorotin, diphenyldichlorotin, divinyldichlorotin, methyltrichlorotin, phenyltrichlorotin, dichlorolead, methylchlorolead and phenylchlorolead; and compounds obtained by replacing the chlorine atom contained in the above-exemplified compounds with a fluorine atom, a bromine atom or an iodine atom. Among them, preferred is tetrachlorosilane, methyltrichlorosilane, ethyltrichlorosilane, n-propyltrichlorosilane, n-butyltrichlorosilane, phenyltrichlorosilane, tetrachlorotin, methyltrichlorotin or n-butyltrichlorotin.

The halogenation compound is preferably titanium tetrachloride, methyldichloroaluminum, ethyldichloroaluminum, tetrachlorosilane, phenyltrichlorosilane, methyltrichlorosilane, ethyltrichlorosilane, n-propyltrichlorosilane or tetrachlorotin, or a combination of two or more thereof, and particularly preferably titanium tetrachloride or tetrachlorosilane, from a viewpoint of an activity of a polymerization catalyst.

Use of the above internal electron donor in the step (1) may improve an activity or copolymerizability of a polymerization catalyst in the present invention. Examples of the internal electron donor are oxygen-containing electron donors such as ethers, ketones, aldehydes, carboxylic acids, organic acid esters, inorganic acid esters, organic acid amides, inorganic acid amides and acid anhydrides; and nitrogen-containing electron donors such as ammonia, amines, nitriles and isocyanates. Among them, preferred are organic acid esters and/or ethers, and more preferred are carboxylic acid esters and/or ethers.

Examples of the above carboxylic acid esters of the internal electron donor are monocarboxylic acid esters and polycarboxylic acid esters. More specific examples thereof are saturated aliphatic monocarboxylic acid esters, saturated aliphatic polycarboxylic acid esters, unsaturated aliphatic monocarboxylic acid esters, unsaturated aliphatic polycarboxylic acid esters, alicyclic monocarboxylic acid esters, alicyclic polycarboxylic acid esters, aromatic monocarboxylic acid esters, and aromatic polycarboxylic acid esters. Preferred are unsaturated aliphatic carboxylic acid esters such as methacrylic acid esters and maleic acid esters, or aromatic carboxylic acid esters such as benzoic acid esters and phthalic acid esters. Specific examples thereof are methyl acetate, ethyl acetate, phenyl acetate, methyl propionate, ethyl propionate, ethyl butyrate, ethyl valerate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, and phthalic acid esters represented by the following formula [II]:

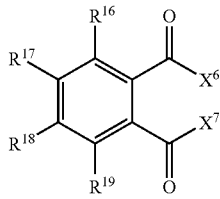

[II]

wherein $R^{16}$, $R^{17}$, $R^{18}$ and $R^{19}$ are independently of one another a hydrogen atom or a hydrocarbyl group; and $X^6$ and $X^7$ are independently of each other a group consisting of hydrogen atoms and carbon atoms, or a group consisting of hydrogen atoms, carbon atoms and one or more oxygen atoms contained in ether bonds.

$R^{16}$, $R^{17}$, $R^{18}$ and $R^{19}$ are preferably a hydrogen atom or a hydrocarbyl group having 1 to 10 carbon atoms, and two or more hydrocarbyl groups of $R^{16}$, $R^{17}$, $R^{18}$ and $R^{19}$ may be linked to one another to form a ring; $X^6$ and $X^7$ are preferably a hydroxyl group or an alkoxy group having 1 to 20 carbon atoms; and when an aromatic ring exits other than the $R^{16}$-$R^{19}$ carrying-benzene ring, the aromatic ring may be partially or totally hydrogenated.

The phthalic acid derivatives represented by the above formula are preferably phthalic acid dialkyl esters; and particularly preferably phthalic acid dialkyl esters, whose two alkyl groups have 8 or less carbon atoms in total. Examples of the phthalic acid derivatives are dimethyl phthalate, methyl ethyl phthalate, diethyl phthalate, di-n-propyl phthalate, diisopropyl phthalate, di-n-butyl phthalate, diisobutyl phthalate, dipentyl phthalate, di-n-hexyl phthalate, di-n-heptyl phthalate, diisoheptyl phthalate, di-n-octyl phthalate, di(2-ethylhexyl) phthalate, di-n-decyl phthalate, diisodecyl phthalate, dicyclohexyl phthalate, diphenyl phthalate, and phthalic dichloride, and a combination of two or more thereof. Among them, preferred is diethyl phthalate, di-n-propyl phthalate, diisopropyl phthalate, di-n-butyl phthalate, or diisobutyl phthalate.

Examples of the above ethers of the internal electron donor are dialky ethers, cyclic ethers which are heterocyclic compounds having at least one ether bond (—C—O—C—) in their rings, and 1,3-diethers.

Examples of the above dialky ethers are dimethyl ether, diethyl ether, di-n-propyl ether, diisopropyl ether, di-n-butyl ether, diisobutyl ether, methyl-n-propyl ether, methyl-n-butyl ether, ethyl-n-propyl ether, ethyl-n-butyl ether, and methyl cyclohexyl ether. Among them, preferred is di-n-butyl ether, which is hereinafter referred to as "dibutyl ether" or "butyl ether".

Examples of the above cyclic ethers are ethylene oxide, propylene oxide, trimethylene oxide, tetrahydrofuran, 2,5-dimethoxytetrahydrofuran, tetrahydropyrane, hexamethylene oxide, 1,3-dioxepane, 1,3-dioxane, 1,4-dioxane, 1,3-dioxolane, 2-methyl-1,3-dioxolane, 2,2-dimethyl-1,3-dioxolane, 4-methyl-1,3-dioxolane, 2,4-dimethyl-1,3-dioxolane, furan, 2,5-dimethylfuran and s-trioxane. Among them, preferred are cyclic ethers containing at least one —C—O—C—O—C— bond in their rings.

Examples of the above 1,3-diethers are those represented by the following formula [III]:

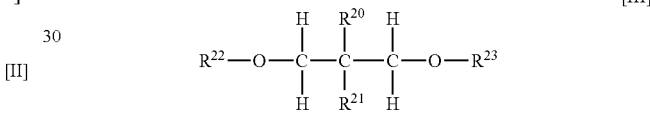

[III]

wherein $R^{20}$, $R^{21}$, $R^{22}$ and $R^{23}$ are independently of one another a $C_{1-20}$ linear alkyl group, a branched alkyl group, an alicyclic alkyl group, an aryl group or an aralkyl group, and $R^{20}$ and $R^{21}$ may be independently of each other a hydrogen atom, and may be linked to each other to form a ring.

Examples of the 1,3-diethers represented by the above formula [III] are 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-3,7-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, and 2-heptyl-2-pentyl-1,3-dimethoxypropane, and a combination of two or more thereof.

The organic acid halide used in the step (1) is preferably monocarboxylic acid halides or polycarboxylic acid halides. Examples thereof are aliphatic carboxylic acid halides, alicyclic carboxylic acid halides, and aromatic carboxylic acid halides. Specific examples thereof are acetyl chloride, propionic acid chloride, butylic acid chloride, valeric acid chloride, acrylic acid chloride, methacrylic acid chloride, benzoic acid chloride, toluic acid chloride, anisic acid chloride, succinic acid chloride, malonic acid chloride, maleic acid chloride, itaconic acid chloride, and phthalic acid chloride. Among them, preferred are aromatic monocarboxylic acid chlorides such as benzoic acid chloride and toluic acid chloride, or aromatic dicarboxylic acid dichlorides such as phthalic acid dichloride, further preferred are aromatic dicarboxylic acid dichlorides, and particularly preferred is phthalic acid dichloride.

The step (1) is carried out usually in an atmosphere of an inert gas such as nitrogen and argon. Examples of an order of contacting the solid material with the halogenation compound and the internal electron donor and/or organic acid halide are the following (1) to (10):

(1) adding a halogenation compound and an internal electron donor to a solid material in an optional order;

(2) adding a halogenation compound and an organic acid halide to a solid material in an optional order;

(3) adding a mixture of a halogenation compound, an internal electron donor and an organic acid halide to a solid material;

(4) adding a mixture of a halogenation compound and an internal electron donor, and an organic acid halide, in an optional order, to a solid material;

(5) adding an internal electron donor to a solid material, and then, adding a halogenation compound thereto;

(6) adding an internal electron donor to a solid material, and then, adding a halogenation compound and an internal electron donor thereto, in an optional order, wherein the former internal electron donor or the latter internal electron donor is additionally added;

(7) adding an internal electron donor to a solid material, and then, adding a mixture of a halogenation compound and an internal electron donor thereto, wherein the former internal electron donor or the latter internal electron donor is additionally added;

(8) adding a solid material and an internal electron donor to a halogenation compound in an optional order;

(9) adding a solid material and an organic acid halide to a halogenation compound in an optional order; and

(10) adding a solid material, an internal electron donor and an organic acid halide to a halogenation compound in an optional order.

The above orders (1) to (10) may be followed by one or more steps of adding a halogenation compound or a mixture of a halogenation compound and an internal electron donor.

Among them, preferred is the order (2); the order (4); the order (4) followed by one or more steps of adding a mixture of a halogenation compound and an internal electron donor; or the order (7), wherein the second step of adding a mixture of a halogenation compound and an internal electron donor may be repeated. More preferred is the order (4); the order (4) followed by one or more steps of adding a mixture of a halogenation compound and an internal electron donor; or the order (7), wherein the second step of adding a mixture of a halogenation compound and an internal electron donor may be repeated. Particularly preferred is the order (4) using an ether as an internal electron donor, followed by the step of adding a mixture of a halogenation compound and an internal electron donor, wherein the internal electron donor is a combination of a carboxylic acid ester and an ether, and further followed by one or more steps of adding a mixture of a halogenation compound and an internal electron donor, wherein the internal electron donor is an ether; or the order (7) using a carboxylic acid ester as the first internal electron donor, and using a combination of a carboxylic acid ester with an ether as the second internal electron donor, followed by one or more steps of adding a mixture of a halogenation compound and an internal electron donor, wherein the internal electron donor is an ether.

A method for contacting the solid material, the halogenation compound, the internal electron donor and/or organic acid halide with one another is not particularly limited.

Examples of the method are conventional methods such as a slurry method, and a mechanically pulverizing method using a ball mill. The mechanically pulverizing method is preferably carried out in the presence of a diluent, in order to suppress production of fine powders, thereby obtaining a solid component having a narrow particle size distribution.

The above diluent is preferably inert to the solid material, the halogenation compound, the internal electron donor and the organic acid halide. Examples of the diluent are aliphatic hydrocarbons such as pentane, hexane, heptane and octane; aromatic hydrocarbons such as benzene, toluene and xylene; licyclic hydrocarbons such as cyclohexane and cyclopentane; and halogenated hydrocarbons such as 1,2-dichloroethane and monochlorobenzene. Among them, preferred are aliphatic hydrocarbons or aromatic hydrocarbons, more preferred are aromatic hydrocarbons, and further preferred is toluene or xylene.

The above diluent is used in an amount of usually 0.1 to 1,000 mL, and preferably 1 to 100 mL, per one g of the solid material, per one contact.

A time for the above contact is not particularly limited, and is preferably 0.5 to 8 hours, and more preferably 1 to 6 hours. Its temperature is usually $-50$ to $150°$ C., preferably 0 to $140°$ C., and further preferably 60 to $135°$ C.

The above contact is carried out preferably under agitation, in order to maintain a homogeneous slurry state. Too week agitation may result in insufficient contact, and therefore, the finally obtained polymerization catalyst may be insufficient in its stereoregularity or activity. Too strong agitation may break the solid component obtained.

The halogenation compound is used in an amount of usually 0.5 to 1,000 mmol, preferably 1 to 200 mmol, and further preferably 2 to 100 mmol, per one gram of the solid material. The halogenation compound is used preferably in combination with the internal electron donor, which is used in an amount of usually 1 to 100 mol, preferably 1.5 to 75 mol, and further preferably 2 to 50 mol, per one mol of the halogenation compound.

The internal electron donor is used in an amount of usually 0.01 to 100 mmol, preferably 0.05 to 50 mmol, and further preferably 0.1 to 20 mmol, per one gram of the solid material.

The organic acid halide is used in an amount of usually 0.1 to 100 mmol, preferably 0.3 to 50 mmol, and further preferably 0.5 to 20 mmol, per one gram of the solid material, and is used in an amount of usually 0.01 to 1.0 mol, and preferably 0.03 to 0.5 mol, per one mol of magnesium atoms contained in the solid material.

When the internal electron donor or organic acid halide is used in an amount of larger than 100 mmol per one gram of the solid material, the obtained solid component having a particulate form may be broken.

Regarding the Step (2):

The step (2) washes away from the solid component such compounds as titanium compounds unfavorable in view of the object of the present invention.

Examples of the hydrocarbon solvent used in the step (2) are aliphatic hydrocarbons such as pentane, hexane, heptane, octane and decane; and aromatic hydrocarbon solvents such as benzene, toluene, ethylbenzene and xylene. Among them, preferred is an aromatic hydrocarbon, and more preferred is toluene or xylene.

Examples of the hydrocarbon solvent used in the step (2) are aromatic hydrocarbon solvents such as benzene, toluene, ethylbenzene and xylene. Among them, preferred is toluene or xylene.

The hydrocarbon solvent is used in an amount of usually 0.1 to 1,000 mL, and preferably 1 to 100 mL, per one g of the solid component, per one washing.

A washing temperature in the step (2) is usually −50 to 150° C., preferably 0 to 140° C., and further preferably 60 to 135° C. A washing time therein is not particularly limited, and is preferably 1 to 120 minutes, more preferably 2 to 60 minutes, and further preferably 5 to 40 minutes. The number of the washing is usually one to five times, and six or more times if needed.

The washing is carried out preferably under agitation, in order to maintain a homogeneous slurry state. Too week agitation may result in insufficient washing, and therefore, the finally obtained polymerization catalyst may be insufficient in its stereoregularity or activity. Too strong agitation may break the solid component.

Regarding the Step (3):

Contact conditions in the step (3) are the same as those in the step (1), except that the solid material in the step (1) is replaced with the washed solid component.

Regarding the Step (4):

Examples of the hydrocarbon solvent used in the step (4) are aliphatic hydrocarbons such as pentane, hexane, heptane, octane and decane; aromatic hydrocarbons such as benzene, toluene, ethylbenzene and xylene. Among them, preferred is an aromatic hydrocarbon, and more preferred is toluene or xylene.

An amount of the hydrocarbon solvent used for washing, and a washing time are similar to those in the step (2) mentioned above.

A washing temperature is 70° C. or higher, generally 70 to 150° C., preferably 90 to 140° C., and more preferably 100 to 135° C.

A washing is carried out four or more times, preferably five or more times, and more preferably six or more times.

The step (4) washes away from the solid component such compounds as titanium compounds unfavorable in view of the object of the present invention, more strongly than the step (2), to the extent that the following filtrate contains titanium atoms in a concentration of 0.08 mg-Ti/ml-filtrate or lower, measured according to a method comprising the steps of:

(1) preparing a suspension of the finally-obtained solid catalyst component for olefin polymerization in heptane having a concentration of 0.1 g-solid catalyst component/ml-suspension;

(2) heating the suspension at 70° C. for 30 minutes under stirring;

(3) filtering the suspension using, for example, a G4 filter, thereby obtaining a filtrate; and (4) measuring a concentration of titanium atoms contained in the filtrate, according to an analytical method known in the art such as an UV-optical density method and an ICP emission method.

The solid catalyst component for olefin polymerization in the present invention contains preferably chlorine atoms as the halogen atoms, and contains preferably ethoxy groups and/or butoxy groups as the hydrocarbyloxy groups.

The solid catalyst component for olefin polymerization in the present invention comprises titanium atoms in an amount of 0.1 to 3.0% by weight and preferably 0.5 to 2.5% by weight, magnesium atoms in an amount of 5 to 30% by weight and preferably 10 to 25% by weight, halogen atoms in an amount of 40 to 70% by weight and preferably 45 to 65% by weight, and hydrocarbyloxy groups in an amount of 0.1 to 3.5% by weight and preferably 0.5 to 3.0% by weight, the total weight of the solid catalyst component being 100% by weight.

The solid catalyst component for olefin polymerization may be used for polymerization in a form of its slurry in an inert solvent, or may be used for polymerization in a form of its fluid dry powder. Examples of a drying method for obtaining the fluid dry powder are a reduced-pressure drying method, and a method comprising the step of removing volatile matters contained in the solid catalyst component under a flow of an inert gas such as nitrogen and argon. The drying is carried out at preferably 0 to 200° C., and more preferably 50 to 100° C., and for preferably 0.01 to 20 hours, and more preferably 0.5 to 10 hours.

The organoaluminum compound used in the present invention is a compound having one or more aluminum-carbon bonds in its molecule, and may be a compound known in the art. Examples thereof are compounds represented by the following formulas, respectively:

$$R^{24}_{w}AlX^{8}_{3-w}, \text{ and}$$

$$R^{25}R^{26}Al\text{—}O\text{—}AlR^{27}R^{28}$$

wherein $R^{24}$ to $R^{28}$ are independently of one another a hydrocarbyl group having 1 to 20 carbon atoms; $X^8$ is a halogen atom, a hydrogen atom or an alkoxy group; and w is a number satisfying $2 \leq w \leq 3$.

Examples of the organoaluminum compound are trialkylaluminums such as triethylaluminum, triisobutylaluminum and trihexylaluminum; dialkylaluminum hydrides such as diethylaluminum hydride and diisobutylaluminum hydride; dialkylaluminum halides such as diethylaluminum chloride; mixtures of trialkylaluminums and dialkylaluminum halides such as a mixture of triethylaluminum and diethylaluminum chloride; and alkylalumoxanes such as tetraethyldialumoxane and tetrabutyldialumoxane. Among them, preferred are trialkylaluminums, mixtures of trialkylaluminums with dialkylaluminum halides, or alkylalumoxanes; and particularly preferred is triethylaluminum, triisobutylaluminum, a mixture of triethylaluminum with diethylaluminum chloride, or tetraethyldialumoxane.

Examples of the external electron donor used in the present invention are oxygen-containing compounds, nitrogen-containing compounds, phosphorus-containing compounds and sulfur-containing compounds. Among them, preferred are oxygen-containing compounds or nitrogen-containing compounds.

Examples of the oxygen-containing compounds are alkoxysilicon compounds, ethers, esters and ketones. Among them, preferred are alkoxysilicon compounds or ethers.

Examples of the alkoxysilicon compounds are compounds represented by the following formula:

$$R^{29}_{r}Si(OR^{30})_{4-r}$$

wherein $R^{29}$ is a hydrocarbyl group having 1 to 20 carbon atoms, a hydrogen atom, or a hetero atom-containing group, and when plural $R^{29}$s exist, they are the same as, or different from one another; $R^{30}$ is a hydrocarbyl group having 1 to 20 carbon atoms, and when plural $R^{30}$s exist, they are the same as, or different from one another; and r is a number satisfying $0 \leq r < 4$.

Examples of the above hydrocarbyl group of $R^{29}$ are a linear alkyl group such as a methyl group, an ethyl group, a propyl group, a butyl group and a pentyl group; a branched-chain alkyl group such as an isopropyl group, a sec-butyl group, a tert-butyl group and a tert-amyl group; a cycloalkyl group such as a cyclopentyl group and a cyclohexyl group; a cycloalkenyl group such as a cyclopentenyl group; and an aryl group such as a pheny group and a tolyl group.

The compounds represented by the above formula are preferably compounds having at least one hydrocarbyl group of $R^{29}$, which contains a secondary or tertiary carbon atom linked to the silicon atom.

Examples of the hetero atom contained in the above hetero atom-containing group of $R^{29}$ are an oxygen atom, a nitrogen atom, a sulfur atom and a phosphorus atom. Examples of the hetero atom-containing group are a dimethylamino group, a methylethylamino group, a diethylamino group, an ethyl-n-propylamino group, a di-n-propylamino group, a pyrrolyl group, a pyridyl group, a pyrrolidinyl group, a piperidyl group, a perhydroindolyl group, a perhydroisoindolyl group, a perhydroquinolyl group, a perhydroisoquinolyl group, a perhydrocarbazolyl group, a perhydroacridinyl group, a furyl group, a pyranyl group, a perhydrofuryl group and a thienyl group. Among them, preferred are hetero atom-containing groups, whose hetero atom is directly linked to the silicon atom.

Examples of the above alkoxysilicon compounds as the oxygen-containing compounds are diisopropyldimethoxysilane, diisobutyldimethoxysilane, di-tert-butyldimethoxysilane, tert-butylmethyldimethoxysilane, tert-butylethyldimethoxysilane, tert-butyl-n-propyldimethoxysilane, tert-butyl-n-butyldimethoxysilane, tert-amylmethyldimethoxysilane, tert-amylethyldimethoxysilane, tert-amyl-n-propyldimethoxysilane, tert-amyl-n-butyldimethoxysilane, isobutylisopropyldimethoxysilane, tert-butylisopropyldimethoxysilane, dicyclobutyldimethoxysilane, cyclobutylisopropyldimethoxysilane, cyclobutylisobutyldimethoxysilane, cyclobutyl-tert-butyldimethoxysilane, dicyclopentyldimethoxysilane, cyclopentylisopropyldimethoxysilane, cyclopentylisobutyldimethoxysilane, cyclopentyl-tert-butyldimethoxysilane, dicylohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcyclopentyldimethoxysilane, diisopropyldiethoxysilane, diisobutyldiethoxysilane, di-tert-butyldiethoxysilane, tert-butylmethyldiethoxysilane, tert-butylethyldiethoxysilane, tert-butyl-n-propyldiethoxysilane, tert-butyl-n-butyldiethoxysilane, tert-amylmethyldiethoxysilane, tert-amylethyldiethoxysilane, tert-amyl-n-propyldiethoxysilane, tert-amyl-n-butyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, 2-norbornanemethyldimethoxysilane, bis(perhydroquinolino)dimethoxysilane, bis(perhydroisoquinolino)dimethoxysilane, (perhydroquinolino)(perhydroisoquinolino)dimethoxysilane, (perhydroquinolino)methyldimethoxysilane, (perhydroisoquinolino)methyldimethoxysilane, (perhydroquinolino)ethyldimethoxysilane, (perhydroisoquinolino)ethyldimethoxysilane, (perhydroquinolino)(n-propyl)dimethoxysilane, (perhydroisoquinolino)(n-propyl)dimethoxysilane, (perhydroquinolino)(tert-butyl)dimethoxysilane, (perhydroisoquinolino)(tert-butyl)dimethoxysilane, diethylaminodimethoxysilane, and diethylaminodiethoxysilane.

Examples of the ethers of the above oxygen-containing compounds are those exemplified above as the cyclic ethers or the 1,3-diethers of the internal electron donor.

Examples of the nitrogen-containing compounds of the above external electron donor are 2,6-substituted piperidines such as 2,6-dimethylpiperidine and 2,2,6,6-tetramethylpiperidine; substituted methylene diamines such as 2,5-substituted piperidines, N,N,N',N'-tetramethylmethylene diamine and N,N,N',N'-tetraethylmethylene diamine; and substituted imidazolidines such as 1,3-dibenzylimidazolidine. Among them, preferred are 2,6-substituted piperidines.

The external electron donor is particularly preferably cyclohexylmethyldimethoxysilane, cyclohexylethyldimethoxysilane, diisopropyldimethoxysilane, tert-butylethyldimethoxysilane, tert-butyl-n-propyldimethoxysilane, phenyldimethoxysilane, diphenyldimethoxysilane, dicyclobutyldimethoxysilane, dicyclopentyldimethoxysilane, 1,3-dioxolane, 1,3-dioxane, 2,6-dimethylpiperidine, 2,2,6,6-tetramethylpiperidine, 2-isopropyl-2-isobutyl-1,3-dimethoxypropane, 2-isopropyl-2-isopentyl-1,3-dimethoxypropane, 2,2-diisobutyl-1,3-dimethoxypropane, 2,2-diisopropyl-1,3-dimethoxypropane or 2,2-dicyclohexyl-1,3-dimethoxypropane.

A method for contacting the solid catalyst component for olefin polymerization with the organoaluminum compound and the external electron donor is not limited. Examples of the method are (1) a method comprising the steps of (1-1) contacting the solid catalyst component with the organoaluminum compound and the external electron donor in the presence or absence of a solvent, and then (1-2) feeding the obtained mixture to a polymerization reactor, (2) a method comprising the step of feeding the solid catalyst component, the organoaluminum compound and the external electron donor separately to a polymerization reactor, thereby contacting those components with one another in the polymerization reactor, and (3) a method comprising the steps of (3-1) contacting any two of the solid catalyst component, the organoaluminum compound and the external electron donor with each other, thereby obtaining a mixture, and (3-2) feeding the mixture and the remaining component to a polymerization reactor, thereby contacting them with each other in the polymerization reactor. The above feeding to a polymerization reactor is carried out preferably in a water-free state and in an atmosphere of an inert gas such as nitrogen and argon.

The olefin in the present invention means ethylene or α-olefins having three or more carbon atoms. Examples of the α-olefins are linear mono-olefins such as propylene, 1-butene, 1-pentene, 1-hexene, 1-heptene, 1-octene and 1-decene; branched mono-olefins such as 3-methyl-1-butene, 3-methyl-1-pentene and 4-methyl-1-pentene; and vinylcyclohexane. Those olefins may be used in combination of two or more thereof, and may be used in combination with monomers containing plural unsaturated bonds such as conjugated dienes and non-conjugated dienes.

The olefin polymer in the present invention is preferably a propylene homopolymer, a 1-butene homopolymer, a 1-pentene homopolymer, a 1-hexene homopolymer, an ethylene-propylene copolymer, an ethylene-1-butene copolymer, an ethylene-1-hexene copolymer, a propylene-1-butene copolymer, a propylene-1-hexene copolymer, an ethylene-propylene-1-butene copolymer, an ethylene-propylene-1-hexene copolymer, or a hetero-block copolymer; more preferably a propylene homopolymer or a propylene copolymer containing mainly propylene units; further preferably a propylene homopolymer or a propylene copolymer containing 50% by weight or more of a propylene unit, the total of the propylene copolymer being 100% by weight; and particularly preferably a stereoregular propylene homopolymer. The above "hetero-block copolymer" means a mixture of two or more kinds of polymers, such as a mixture of a propylene homopolymer with an ethylene-propylene copolymer, which is produced according to a process comprising the steps of (i) homopolymerizing propylene, thereby forming a propylene homopolymer, and (ii) copolymerizing ethylene with propylene in the presence of the propylene homopolymer.

Stereoregularity of a propylene homopolymer or a propylene copolymer containing mainly propylene units can be represented by an amount of soluble parts in xylene at 20° C. (CXS) of the homopolymer or the copolymer. The smaller the CXS value is, the higher the stereoregularity is. A CXS of a propylene homopolymer is preferably 0.6% by weight or smaller, and more preferably 0.5% by weight or smaller, the total of the propylene homopolymer being 100% by weight.

Prior to polymerizing an olefin in the presence of the above catalyst for olefin polymerization, which is referred to as "real polymerization", the following "pre-polymerization" can be carried out.

The pre-polymerization is carried out using a combination of the above solid catalyst component for olefin polymerization with a monomer such an olefin, in order to make a pre-polymerized catalyst component whose surface is covered by a polymer such as a polyolefin formed by pre-polymerizing the monomer such as an olefin. The real polymerization uses the solid catalyst component for olefin polymerization without modification, or uses the above pre-polymerized catalyst component.

The pre-polymerized catalyst component is preferably produced by slurry polymerization of a small amount of an olefin in the presence of the above solid catalyst component for olefin polymerization and organoaluminum compound. Examples of a solvent used for the slurry polymerization are inert hydrocarbon solvents such as propane, butane, isobutane, pentane, isopentane, hexane, heptane, octane, cyclohexane, benzene and toluene. A partial or total amount of the inert hydrocarbon solvents may be replaced with liquid olefins.

The organoaluminum compound in the pre-polymerization is used in an amount of usually 0.5 to 700 mol, preferably 0.8 to 500 mol, and particularly preferably 1 to 200 mol, per one mol of titanium atoms contained in the solid catalyst component for olefin polymerization used.

An amount of an olefin pre-polymerized is usually 0.01 to 1,000 g, preferably 0.05 to 500 g, and particularly preferably 0.1 to 200 g, per 1 g of the solid catalyst component for olefin polymerization used.

A slurry concentration of the above slurry polymerization is preferably 1 to 500 g-solid catalyst component/liter-solvent, and particularly preferably 3 to 300 g-solid catalyst component/liter-solvent.

The pre-polymerization is carried out at preferably −20 to 100° C., and particularly preferably 0 to 80° C. A partial pressure of an olefin contained in a gas phase of the pre-polymerization is preferably 1 kPa to 2 MPa, and particularly preferably 10 kPa to 1 MPa, except an olefin having a liquid state under a pre-polymerization pressure and temperature. A pre-polymerization time is not particularly limited, and is preferably 2 minutes to 15 hours.

Examples of a method for feeding the solid catalyst component, the organoaluminum compound and an olefin to a pre-polymerization reactor are (1) a method comprising the steps of (1-1) feeding the solid catalyst component and the organoaluminum compound, and then (1-2) feeding an olefin, and (2) a method comprising the steps of (2-1) feeding the solid catalyst component and an olefin, and then (2-2) feeding the organoaluminum compound. Examples of a method for feeding an olefin to a pre-polymerization reactor are (1) a method comprising the step of feeding an olefin one after another while keeping an inner pressure of a pre-polymerization reactor at a predetermined pressure, and (2) a method comprising the step of feeding the predetermined total amount of an olefin at the beginning. In order to control a molecular weight of an obtained pre-polymer, a chain transfer agent such as hydrogen may be added to a pre-polymerization reactor.

The pre-polymerization may use a partial or total amount of the external electron donor to be used in the above-mentioned production of the polymerization catalyst. An amount of an external electron donor used in the pre-polymerization is usually 0.01 to 400 mol, preferably 0.02 to 200 mol, and particularly preferably 0.03 to 100 mol, per one mol of titanium atoms contained in the solid catalyst component, or is usually 0.003 to 5 mol, preferably 0.005 to 3 mol, and particularly preferably 0.01 to 2 mol, per 1 mol of the organoaluminum compound used.

In the pre-polymerization, a method for feeding the organoaluminum compound and the external electron donor to a pre-polymerization reactor is not particularly limited. Examples of the method are (1) a method comprising the step of feeding the external electron donor thereto separately from the organoaluminum compound, and (2) a method comprising the steps of (i) contacting the external electron donor with the organoaluminum compound, thereby forming a mixture, and then (ii) feeding the mixture to the pre-polymerization reactor. An olefin used for the pre-polymerization is the same as, or different from that used for the real polymerization.

The organoaluminum compound in the real polymerization is used in an amount of usually 1 to 1,000 mol, and particularly preferably 5 to 600 mol, per one mol of titanium atoms contained in the solid catalyst component used.

The external electron donor in the real polymerization is used in an amount of usually 0.1 to 2,000 mol, preferably 0.3 to 1,000 mol, and particularly preferably 0.5 to 800 mol, per one mol of titanium atoms contained in the solid catalyst component used, or is used in an amount of usually 0.001 to 5 mol, preferably 0.005 to 3 mol, and particularly preferably 0.01 to 1 mol, per one mol of the organoaluminum compound used.

The real polymerization is carried out:

(1) at usually −30 to 300° C., and preferably 20 to 180° C.;

(2) under a pressure, which is not particularly limited, of usually an atmospheric pressure to 10 MPa, and preferably 200 kPa to 5 MPa, from an industrial and economical point of view;

(3) according to a batchwise method or a continuous method; and (4) according to (4-1) a slurry or solution polymerization method with an inert hydrocarbon solvent such as propane, butane, isobutane, pentane, hexane, heptane and octane, (4-2) a bulk polymerization method using an olefin as a solvent, which olefin is liquid at a polymerization temperature, or (4-3) a gas-phase polymerization method.

The real polymerization may be a hetero-block copolymerization carried out according to two or more polymerization steps.

In order to control a molecular weight of an olefin polymer produced, a chain transfer agent such as hydrogen may be used.

According to the present invention, there can be provided (i) a solid catalyst component for olefin polymerization capable of producing a highly stereoregular olefin polymer, which can be molded into an injection-molded article having superior stiffness, (ii) a process for producing the above solid catalyst component (i), (iii) a process for producing an olefin polymerization catalyst using the above solid catalyst component (i); and (iv) a process for producing an olefin polymer using an olefin polymerization catalyst produced according to the above process (iii).

EXAMPLE

The present invention is explained in more detail with reference to the following Examples, which do not limit the present invention.

Example 1

1. Preparation of a Solid Catalyst Component

A reactor equipped with a stirrer was purged with nitrogen gas, and then 800 liters of hexane, 6.8 kg of diisobutyl phthalate, 350 kg of tetraethoxysilane and 38.8 kg of tetra-n-butoxytitanium were put into the reactor. The resultant mixture was stirred. To the mixture, 900 liters of a dibutyl ether solution (concentration: 2.1 mol/liter) of butylmagnesium chloride were added dropwise at 7° C. over 5 hours under stirring. After completion of the dropwise addition, the mixture was stirred at 20° C. for one hour. The obtained reaction mixture was filtered to separate a solid. The separated solid was washed three times at room temperature with each 1,100 liters of toluene to obtain a washed solid. Toluene was added to the washed solid, thereby obtaining 625 liters of a toluene slurry of the solid. The toluene slurry was heated at 70° C. for one hour under stirring, and then was cooled down to the room temperature, thereby obtaining a toluene slurry of a solid material.

A part of the toluene slurry was dried under a reduced pressure, thereby obtaining a dried solid material. The dried solid material was found to contain 2.1% by weight of titanium atoms, 38.9% by weight of ethoxy groups, and 3.4% by weight of butoxy groups, the total weight of the dried solid material being 100% by weight, and the above titanium atoms were found to be trivalent.

Step (1):

A 100 mL-flask equipped with a stirrer, a dropping funnel and a thermometer was purged with nitrogen gas. There was put into the flask the above solid material-containing toluene slurry, the total of the toluene slurry used containing 8 g of the dried solid material. Supernatant toluene in the flask was taken out till the total volume of the toluene slurry was decreased to 26.5 mL. To the slurry, a mixture of 16.0 mL of titanium tetrachloride with 0.8 mL of dibutyl ether was added at 40° C., and further, a mixture of 2.0 mL of phthalic acid dichloride with 2.0 mL of toluene was added dropwise over five minutes. After completion of the dropwise addition, the resultant reaction mixture was stirred at 115° C. for four hours. The obtained reaction mixture was filtered at 115° C. to separate a solid component.

Step (2):

The above-separated solid component was washed three times at 115° C. with each 40 mL of toluene.

Step (3):

Toluene was added to the above-washed solid component, thereby obtaining 26.5 mL of a toluene slurry. To the toluene slurry, a mixture of 0.8 mL of dibutyl ether, 0.45 mL of diisobutyl phthalate, and 6.4 mL of titanium tetrachloride was added. The resultant mixture was stirred at 105° C. for one hour. The obtained reaction mixture was filtered to separate a solid component.

Step (2) Repeated:

The above-separated solid component was washed two times at 105° C. with each 40 mL of toluene.

Step (3) Repeated:

Toluene was added to the above-washed solid component, thereby obtaining 26.5 mL of a toluene slurry. To the toluene slurry, a mixture of 0.8 mL of dibutyl ether with 6.4 mL of titanium tetrachloride was added. The resultant mixture was stirred at 105° C. for one hour. The obtained reaction mixture was filtered to separate a solid component.

Step (2) Further Repeated:

The above-separated solid component was washed two times at 105° C. with each 40 mL of toluene.

Step (3) Further Repeated:

Toluene was added to the above-washed solid component, thereby obtaining 26.5 mL of a toluene slurry. To the toluene slurry, a mixture of 0.8 mL of dibutyl ether with 6.4 mL of titanium tetrachloride was added. The resultant mixture was stirred at 105° C. for one hour. The obtained reaction mixture was filtered to separate a solid component.

Step (4):

The above-separated solid component was washed six times at 105° C. with each 40 mL of toluene, and was further washed three times at a room temperature with each 40 mL of hexane. The washed solid component was dried under a reduced pressure, thereby obtaining a solid catalyst component for olefin polymerization.

The above-obtained solid catalyst component for olefin polymerization was found to contain 1.6% by weight of titanium atoms, 0.06% by weight of ethoxy groups, 0.15% by weight of butoxy groups, 7.6% by weight of diethyl phthalate, 0.8% by weight of ethyl-n-butyl phthalate, and 2.5% by weight of diisobutyl phthalate, the total weight of the solid catalyst component being 100% by weight.

There was added 5.07 g of the above solid catalyst component for olefin polymerization to 51 mL of heptane maintained at 70° C., thereby preparing a suspension of the solid catalyst component for olefin polymerization in heptane having a concentration of 0.1 g-solid catalyst component/ml-suspension. The prepared suspension was stirred at 70° C. for 30 minutes, and was filtered with G4 filter. The obtained filtrate was found to contain titanium atoms in a concentration of 0.023 mg/ml, measured according to the following method comprising the steps of:

(1) putting 40 mL of the filtrate into a 50 mL measuring flask;

(2) evaporating the total amount of heptane contained in the filtrate with a nitrogen gas flow;

(3) decomposing the solid catalyst component with about 30 mL of 2 normal (2 N) dilute sulfuric acid;

(4) adding 3 mL of hydrogen peroxide water having a concentration of 3% by weight, thereby preparing a liquid sample;

(5) measuring a characteristic absorption of the liquid sample at 410 nm with a double-beam spectrophotometer, U-2001, manufactured by Hitachi, Ltd.; and (6) finding a concentration of titanium atoms in the filtrate, based on the characteristic absorption, with a calibration curve prepared in advance.

2. Polymerization of Propylene

A stainless steel autoclave having a 3-liter inner volume was made vacuum, and hydrogen gas was added thereto till its partial pressure reached 0.15 MPa. There were put into the autoclave 7.81 mg of the above-obtained solid catalyst component, 2.6 mmol of triethylaluminum (organoaluminum compound) and 0.52 mmol of tert-butyl-n-propyldimethoxysilane (external electron donor), and then 780 g of liquid propylene was put therein. The autoclave was heated up to 70° C., and propylene was polymerized at 70° C. for one hour, thereby obtaining 319 g of a powdery propylene homopolymer.

A yield of the propylene homopolymer per one g of the solid catalyst component was 40,800 g/g. The propylene homopolymer had 0.48% by weight of soluble parts in xylene at 20° C. (CXS), the total weight of the propylene homopolymer being 100% by weight; an intrinsic viscosity ([η]) of 1.71 dl/g; and a bulk density of 0.448 g/mL.

The above titanium atom content (% by weight) was measured according to a method comprising the steps of:

(1) decomposing about 20 mg of a sample with about 30 mL of 2 normal (2 N) dilute sulfuric acid;

(2) adding 3 mL (excess amount) of hydrogen peroxide water having a concentration of 3% by weight, thereby preparing a liquid sample;

(3) measuring a characteristic absorption of the liquid sample at 410 nm with a double-beam spectrophotometer, U-2001, manufactured by Hitachi, Ltd.; and (4) finding a titanium atom content, based on the characteristic absorption, with a calibration curve prepared in advance.

The above alkoxy group content (% by weight) was measured according to a method comprising the steps of:

(1) decomposing about 2 g of a sample with 100 mL of water to obtain a liquid sample;

(2) measuring an amount of an alcohol (corresponding to an alkoxy group) contained in the liquid sample according to a gas chromatography internal standard method; and (3) converting the obtained amount of an alcohol to an alkoxy group content.

The above carboxylic acid ester content (% by weight) was measured according to a method comprising the steps of:

(1) dissolving 30 mg of a sample in 100 mL of N,N-dimethylacetamide, thereby preparing a solution; and (2) measuring a content of a carboxylic acid ester in the solution according to a gas chromatography internal standard method.

The above valence of titanium atoms (trivalent titanium atoms) was measured according to a method comprising the steps of:

(1) dissolving about 70 mg of a solid material in about 30 mL of an aqueous solution consisting of 240 mL of purified water, 113 g of tartaric acid and 260 mL of two normal (2 N) sulfuric acid, thereby preparing a solution; and (2) measuring a valence of titanium atoms contained in the solution with a polarographic analyzer, P-1100, manufacture by Yanagimoto Corporation according to a DC (direct-current) electricity method.

The above amount of soluble parts in xylene at 20° C. (CXS) was measured according to a method comprising the steps of:

(1) dissolving 1 g of a polymer in 200 mL of boiling xylene;

(2) cooling the solution gradually down to 50° C., (3) further cooling the solution under stirring in an ice-water bath down to 20° C., (4) allowing the solution to stand at 20° C. for 3 hours, thereby precipitating a polymer, (5) filtering off the precipitated polymer, thereby obtaining a filtrate, and (6) measuring the amount of the polymer dissolved in the filtrate, which polymer is the above soluble parts in xylene at 20° C.

The smaller the CXS value is, the larger stereoregularity the polymer has.

The above intrinsic viscosity ([η]) was measured at 135° C. using an Ubbellohde viscometer in TETRALINE (tetrahydronaphthalene) as a solvent.

The above bulk density was measured according to JIS K 6721 (1966), "JIS" being Japanese Industrial Standard.

Example 2

1. Preparation of a Solid Catalyst Component

Example 1 was repeated except that "washing six times at 105° C. with each 40 mL of toluene, and further washing three times at a room temperature with each 40 mL of hexane" in the step (4) of Example 1 was changed to "washing five times at 105° C. with each 40 mL of toluene, and further washing three times at a room temperature with each 40 mL of hexane", thereby obtaining a solid catalyst component.

The above-obtained solid catalyst component was found to contain 1.7% by weight of titanium atoms, 0.07% by weight of ethoxy groups, 0.16% by weight of butoxy groups, 7.6% by weight of diethyl phthalate, 0.76% by weight of ethyl-n-butyl phthalate, and 2.5% by weight of diisobutyl phthalate, the total weight of the solid catalyst component being 100% by weight.

There was added 4.98 g of the above solid catalyst component to 49.8 mL of heptane maintained at 70° C., thereby preparing a suspension of the solid catalyst component in heptane having a concentration of 0.1 g-solid catalyst component/ml-suspension. The prepared suspension was stirred at 70° C. for 30 minutes, and was filtered with G4 filter. The obtained filtrate was found to contain titanium atoms in a concentration of 0.029 mg/ml, measured according to the above method.

2. Polymerization of Propylene

Example 1 was repeated except that 7.81 mg of the solid catalyst component was changed to 4.48 mg of the above-obtained solid catalyst component, thereby obtaining 203 g of a powdery propylene homopolymer.

A yield of the propylene homopolymer per one g of the solid catalyst component was 45,300 g/g. The propylene homopolymer had 0.55% by weight of soluble parts in xylene at 20° C. (CXS), the total weight of the propylene homopolymer being 100% by weight; an intrinsic viscosity ([η]) of 1.68 dl/g; and a bulk density of 0.450 g/mL.

Example 3

1. Preparation of a Solid Catalyst Component

Example 1 was repeated except that "washing six times at 105° C. with each 40 mL of toluene, and further washing three times at a room temperature with each 40 mL of hexane" in the step (4) of Example 1 was changed to "washing four times at 105° C. with each 40 mL of toluene, and further washing three times at a room temperature with each 40 mL of hexane", thereby obtaining a solid catalyst component.

The above-obtained solid catalyst component was found to contain 1.8% by weight of titanium atoms, 0.07% by weight of ethoxy groups, 0.18% by weight of butoxy groups, 7.8% by weight of diethyl phthalate, 0.8% by weight of ethyl-n-butyl phthalate, and 2.5% by weight of diisobutyl phthalate, the total weight of the solid catalyst component being 100% by weight.

There was added 4.83 g of the above solid catalyst component to 48 mL of heptane maintained at 70° C., thereby preparing a suspension of the solid catalyst component in heptane having a concentration of 0.1 g-solid catalyst component/ml-suspension. The prepared suspension was stirred at 70° C. for 30 minutes, and was filtered with G4 filter. The obtained filtrate was found to contain titanium atoms in a concentration of 0.074 mg/ml, measured according to the above method.

2. Polymerization of Propylene

Example 1 was repeated except that 7.81 mg of the solid catalyst component was changed to 5.82 mg of the above-obtained solid catalyst component, thereby obtaining 292 g of a powdery propylene homopolymer.

A yield of the propylene homopolymer per one g of the solid catalyst component was 50,200 g/g. The propylene homopolymer had 0.56% by weight of soluble parts in xylene at 20° C. (CXS), the total weight of the propylene homopolymer being 100% by weight; an intrinsic viscosity ([η]) of 1.60 dl/g; and a bulk density of 0.442 g/mL.

Comparative Example 1

1. Preparation of a Solid Catalyst Component

Example 1 was repeated except that "washing six times at 105° C. with each 40 mL of toluene, and further washing three times at a room temperature with each 40 mL of hexane" in the step (4) of Example 1 was changed to "washing three times at 105° C. with each 40 mL of toluene, and further washing three times at a room temperature with each 40 mL of hexane", thereby obtaining a solid catalyst component.

The above-obtained solid catalyst component was found to contain 2.1% by weight of titanium atoms, 0.06% by weight of ethoxy groups, 0.19% by weight of butoxy groups, 7.7% by weight of diethyl phthalate, 0.8% by weight of ethyl-n-butyl phthalate, and 2.5% by weight of diisobutyl phthalate, the total weight of the solid catalyst component being 100% by weight.

There was added 4.55 g of the above solid catalyst component to 46 mL of heptane maintained at 70° C., thereby preparing a suspension of the solid catalyst component in heptane having a concentration of 0.1 g-solid catalyst component/ml-suspension. The prepared suspension was stirred at 70° C. for 30 minutes, and was filtered with G4 filter. The obtained filtrate was found to contain titanium atoms in a concentration of 0.085 mg/ml, measured according to the above method.

2. Polymerization of Propylene

Example 1 was repeated except that 7.81 mg of the solid catalyst component was changed to 8.21 mg of the above-obtained solid catalyst component, thereby obtaining 432 g of a powdery propylene homopolymer.

A yield of the propylene homopolymer per one g of the solid catalyst component was 52,600 g/g. The propylene homopolymer had 0.62% by weight of soluble parts in xylene at 20° C. (CXS), the total weight of the propylene homopolymer being 100% by weight; an intrinsic viscosity ([η]) of 1.66 dl/g; and a bulk density of 0.443 g/mL.

The invention claimed is:

1. A process for producing a solid catalyst component for olefin polymerization, comprising the following steps (1) and (4) in this order, or comprising the following step (1), one or more repetitions of a combination of the following steps (2) and (3) in this order, and the following step (4), in this order:

(1) contacting a solid material containing magnesium atoms and hydrocarbyloxy groups, a halogenation compound and an internal electron donor and/or organic acid halide with one another, thereby obtaining a solid component;

(2) washing the solid component with a hydrocarbon solvent;

(3) contacting the washed solid component, a halogenation compound, and an internal electron donor and/or organic acid halide with one another; and (4) washing the solid component with a hydrocarbon solvent at 70° C. or higher four or more times;

the solid catalyst component for olefin polymerization comprising titanium atoms, magnesium atoms, halogen atoms and hydrocarbyloxy groups, wherein the following filtrate contains titanium atoms in a concentration of 0.08 mg-Ti/ml-filtrate or lower, measured according to a method comprising the steps of (1) preparing a suspension of the solid catalyst component for olefin polymerization in heptane having a concentration of 0.1 g-solid catalyst component/ml-suspension;

(2) heating the suspension at 70° C. for 30 minutes under stirring;

(3) filtering the suspension, thereby obtaining a filtrate; and (4) measuring a concentration of titanium atoms contained in the filtrate.

2. The process for producing a solid catalyst component for olefin polymerization according to claim 1, wherein the hydrocarbon solvent in the step (4) is an aromatic hydrocarbon solvent.

3. The process for producing a solid catalyst component for olefin polymerization according to claim 1, wherein the hydrocarbon solvent in the step (4) is toluene or xylene.

4. The process for producing a solid catalyst component for olefin polymerization according to claim 1, wherein the solid material containing magnesium atoms and hydrocarbyloxy groups in the step (1) is a solid material containing trivalent titanium atoms, magnesium atoms and hydrocarbyloxy groups.

5. The process for producing a solid catalyst component for olefin polymerization according to claim 1, wherein the solid material containing magnesium atoms and hydrocarbyloxy groups in the step (1) is a solid material produced according to a process comprising the step of reducing a titanium compound represented by the following formula [I] with an organomagnesium compound in the presence of an organosilicon compound containing a Si—O bond, or in the presence of a combination of the organosilicon compound with an ester compound:

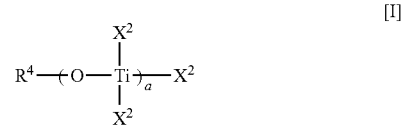

wherein $R^4$ is a hydrocarbyl group having 1 to 20 carbon atoms; $X^2$ is independently of one another a halogen atom or a hydrocarbyloxy group having 1 to 20 carbon atoms; and a is a number of 1 to 20.

6. A process for producing an olefin polymerization catalyst, comprising a step of contacting the solid catalyst component for olefin polymerization produced according to the process of claim 1 with an organoaluminum compound and an external electron donor.

7. A process for producing an olefin polymer, comprising the step of contacting an olefin with the olefin polymerization catalyst produced according to the process of claim 6.

* * * * *